(12) United States Patent
Black et al.

(10) Patent No.: US 6,564,436 B2
(45) Date of Patent: May 20, 2003

(54) METHOD OF FORMING AN IMAGED COMPOUND TEXTILE FABRIC

(75) Inventors: Samuel Keith Black, Garner, NC (US); Charles Keith Curtis, Benson, NC (US); Shane James Moran, Willow Springs, NC (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 10/008,736

(22) Filed: Dec. 6, 2001

(65) Prior Publication Data

US 2003/0009862 A1 Jan. 16, 2003

Related U.S. Application Data

(60) Provisional application No. 60/251,683, filed on Dec. 6, 2000.

(51) Int. Cl.$^7$ .................................................. D06B 1/02
(52) U.S. Cl. .............................. 28/104; 28/163; 28/167
(58) Field of Search ............................ 28/104, 105, 106, 28/103, 163, 167, 151; 26/69 R; 442/240, 241, 247, 276; 139/383 R

(56) References Cited

U.S. PATENT DOCUMENTS

| | | | | |
|---|---|---|---|---|
| 4,144,370 A | * | 3/1979 | Boulton ........................ | 28/104 |
| 4,145,468 A | * | 3/1979 | Mizoguchi et al. .......... | 442/269 |
| 4,146,663 A | * | 3/1979 | Ikeda et al. .................. | 28/104 |
| 4,190,695 A | * | 2/1980 | Niederhauser ................ | 442/2 |
| 4,695,500 A | * | 9/1987 | Dyer et al. ................... | 428/134 |
| 5,136,761 A | * | 8/1992 | Sternlieb et al. ............. | 28/104 |
| 5,153,056 A | * | 10/1992 | Groshens ...................... | 28/104 |
| 5,281,441 A | * | 1/1994 | Kasai et al. .................. | 28/104 |
| 5,632,072 A | * | 5/1997 | Simon et al. ................. | 28/163 |
| 5,674,587 A | * | 10/1997 | James et al. .................. | 28/104 |
| 5,806,155 A | * | 9/1998 | Malaney et al. .............. | 28/167 |
| 6,430,788 B1 | * | 8/2002 | Putnam et al. ................ | 28/104 |

\* cited by examiner

*Primary Examiner*—Amy B. Vanatta
(74) *Attorney, Agent, or Firm*—Wood, Phillips, Katz, Clark & Mortimer

(57) ABSTRACT

The present invention contemplates a method of forming a textile laminate or composite fabric from a plurality of woven fabric layers, with the method contemplating use of a three-dimensional image transfer device to facilitate efficient and commercially viable use of the method.

Herein is disclosed a method of forming an imaged textile laminate or composite compound fabric, the fabric having a first textile fabric layer comprising a plurality of interwoven warp and weft yarns and at least one other textile fabric layer, the lamination of the fabric layers and imaging of the construct occurring on a three-dimensional image transfer device. The image transfer device has a foraminous, image-forming surface comprising a regular pattern of three-dimensional surface elements.

7 Claims, 5 Drawing Sheets

Upper Plane Thickness: 0.24"
Lower Plane Thickness: 0.14"

Upper Plane Thickness: 0.24"
Lower Plane Thickness: 0.14"

0.5"

0.5"

METHOD OF FORMING AN IMAGED COMPOUND TEXTILE FABRIC

TECHNICAL FIELD

The present invention relates generally to a method of forming a laminate or composite compound textile fabric, and more particularly to a method of overlaying a textile fabric layer with at least one other textile fabric layer on a three-dimensional image transfer device, whereby the fabric layers are entangled together and a regular pattern defined by the image transfer device is imparted to the compound fabric.

BACKGROUND OF THE INVENTION

Woven textile fabrics, including a plurality of interwoven warp and weft yarns, are used in a wide variety of applications, including apparel, home furnishings, recreational products, and industrial applications. Because of the expense associated with spinning of yarns, and weaving of textile fabrics, techniques have been developed for manufacture of nonwoven fabrics from fibrous or filamentary materials. Typically, manufacture of nonwoven fabrics entails creating a web or batt of fibrous or filamentary material, and treating the web in a manner to provide the resultant fabric with the desired physical properties.

The inherent physical performance of a single layer of fabric, whether woven or nonwoven, is constrained within the limits of the basis weight for that material. Should there be a desire for a single fabric layer to have a higher level of performance, a change in the constituent material and/or the mode of fabric formation must occur. For example, in order to fabricate a textile fabric with a better uniformity of yarn coverage, it is generally accepted by those skilled in the art that the yarn count must increase. An increase in yarn count, however, requires that the weaving process have a lower throughput and a corresponding increase in complexity. When a nonwoven fabric is desired to have improved fiber coverage, typically, additional fiber is used in the web construction, additional cards employed, and complicated air-randomizing or cross-lapping equipment incorporated. Again, a deleterious effect on fabric manufacture and relative costs is realized in making such a change in fabric physical performance.

It has been appreciated in the prior art that a fabric material having improved physical performance could be obtained by incorporating one or more layers of fabric into a unitary construction. Relatively lightweight fabrics, which are much simpler and cost effective to construct, but have low inherent physical performance, are placed in face-to-face juxtaposition. In order to form the material into a laminate or composite fabric, a layer of adhesive is interposed at that interface. The adhesive has been typically selected from those forms including an adhesive spunbond layer, adhesive powder dispersion, or the spray application of a liquid adhesive. The resulting laminate or composite fabric, referred to hereafter as a compound fabric, thus exhibits an improved physical performance, however, the adhesive binder adversely affects other physical properties, most notably the drapeability and the porosity of the compound fabric. Further, the selection of the binder adhesive and the mechanism of application is not a trivial task, requiring significant experimentation to obtaining a laminate or composite fabric exhibiting the best balance of performance characteristics.

U.S. Pat. No. 5,136,761, to Sternlieb, et al., attempts to address the issue of forming a composite woven-nonwoven fabric without a binder adhesive by the use of hydroentanglement. The Sternlieb patent discloses various techniques for hydro-enhancing and hydro-patterning fabric, including a hydro-bonded nonwoven and woven fabric composite, but it is believed that due to the limitations in imaging techniques disclosed in this patent, such practice has met with only limited commercial success.

The present invention contemplates a method of forming a textile laminate or composite fabric from a plurality of woven fabric layers, with the method contemplating use of a three-dimensional image transfer device to facilitate efficient and commercially viable use of the method.

SUMMARY OF THE INVENTION

Herein is disclosed a method of forming an imaged textile laminate or composite compound fabric, the fabric having a first textile fabric layer comprising a plurality of interwoven warp and weft yarns and at least one other textile fabric layer, the lamination of the fabric layers and imaging of the construct occurring on a three-dimensional image transfer device. The image transfer device has a foraminous, image-forming surface comprising a regular pattern of three-dimensional surface elements.

A first woven textile fabric used in the construction of the compound fabric receives thereupon a second textile fabric. The first and second fabric layers may be of the same or different construction. The juxtaposed textile fabric layers are positioned on the image transfer device, and hydraulic imaging of the fabric effected by subjecting the fabric to pressurized liquid streams applied to a surface of the second woven textile fabric facing away from the image transfer device. By the action of the high-pressure liquid streams, the two textile fabric layers are entangled and the regular pattern defined by the image-forming surface of the image transfer device is imparted to the resulting compound fabric. The aesthetic pattern imparted to the fabric may include an image, which results from rearrangement and displacement of the fabric yarns, to impart a three-dimensionality to the fabric, as well as patterning which results from differential washing of dyes or color from the fabric which corresponds to the pattern of the image transfer device.

It is within the purview of the present invention that an intermediate layer can be interposed between the first and second woven fabric layers prior to hydraulic entanglement on the image transfer device. The intermediate layer can be selected from those fibrous materials exhibiting a high loft property, as typified by a polyester or cotton batting, such that upon lamination and imaging on an image transfer device having an appropriate three-dimensional pattern, a quilt-like laminate is formed. In the alternative, an open mesh scrim can be employed as a reinforcing intermediate layer such that the woven fabrics are able to entangle through the interstices of the scrim layer and form an imaged compound fabric exhibiting low extensibility.

Further, a laminated and imaged compound fabric of the present invention can be treated to form a napped surface. A compound fabric formed by the disclosed lamination procedure results in an entanglement of the constituent fibers composing the yarns. When the imaged compound fabric is subsequently and purposefully delaminated, those entangled fibers are drawn perpendicular to the plane of the original surface and elongated. If a constituent fiber is used in the yarn construction that exhibits crimping upon elongation or stretch, a particularly apparent napped surface is obtained.

The present method has been practiced for imparting an image to polyester and polyester/cotton fabrics comprising polyester and blended polyester/cotton fibers, respectively. As will be appreciated, the technique can be employed for imparting an image to a wide variety of woven fabrics. Standard, low cost textile products can be transformed into high value, three-dimensional fabrics suitable for apparel, home furnishing, upholstery, and other applications. A fabric that is otherwise substantially uniform in appearance can be provided with an aesthetically pleasing pattern, reflecting the three-dimensionality of the fabric and/or color variations therein.

DETAILED DESCRIPTION

Figure 1:
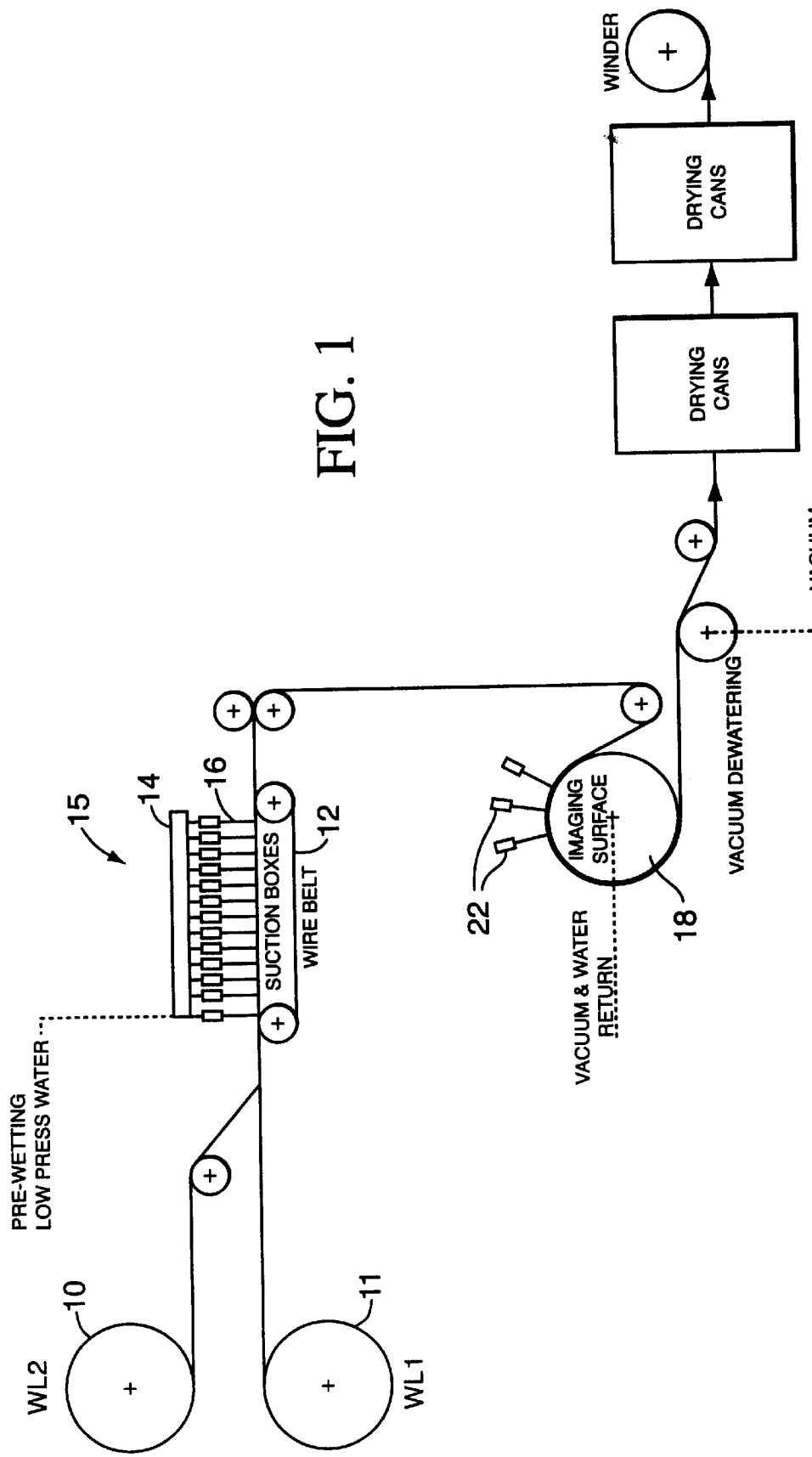
FIG. 1 is a diagrammatic view of an apparatus for imaging a woven textile fabric embodying the principles of the present invention.
Figure 2:
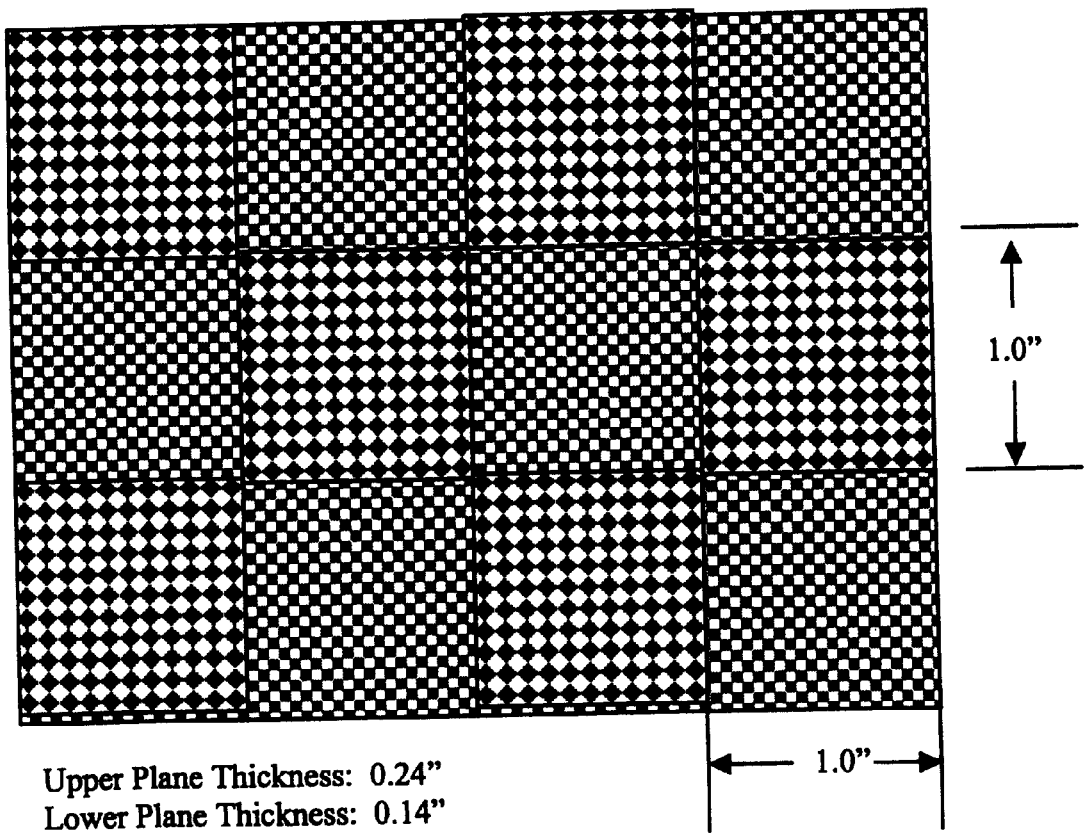
FIGS. 2–5 are diagrammatic views of the image-forming surface of a three-dimensional image transfer device of the apparatus shown in FIG. 1.
Figure 3:
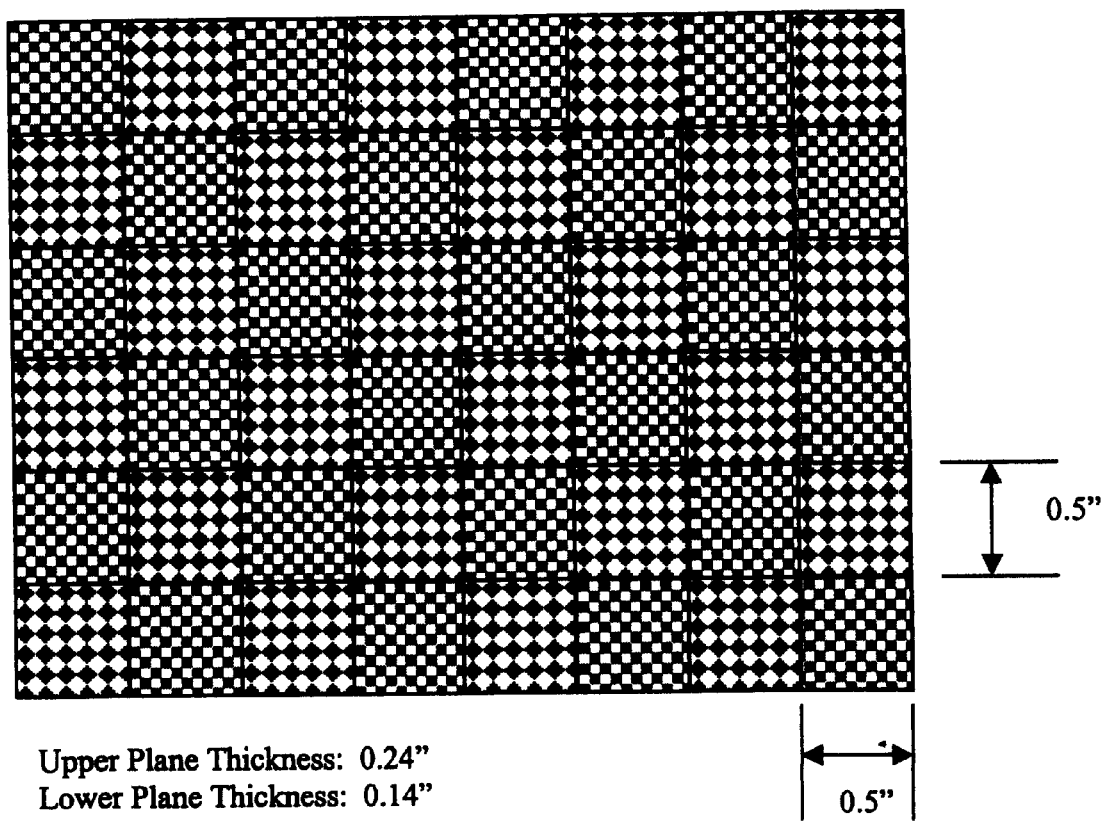
Figure 4:
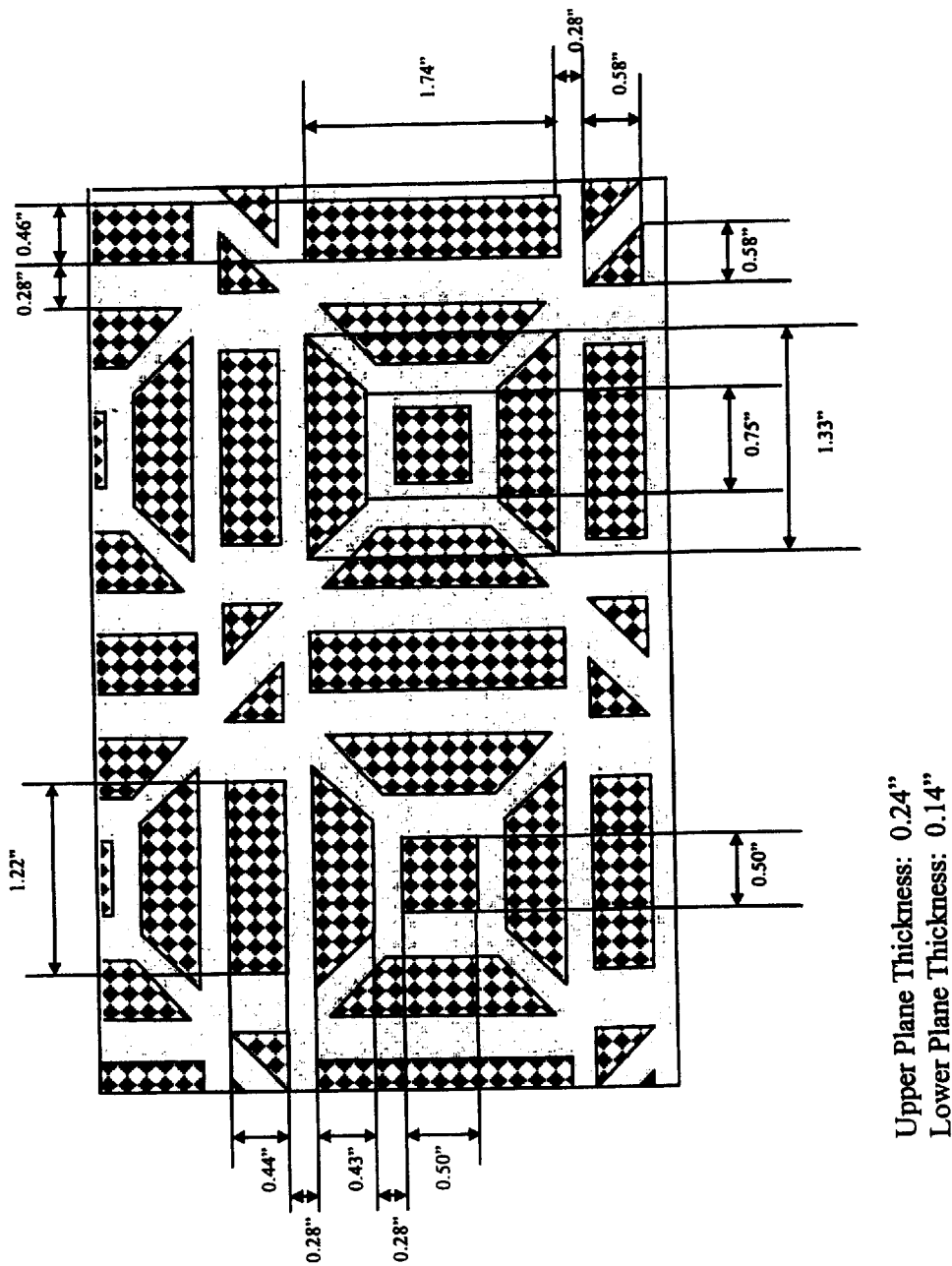
Figure 5:
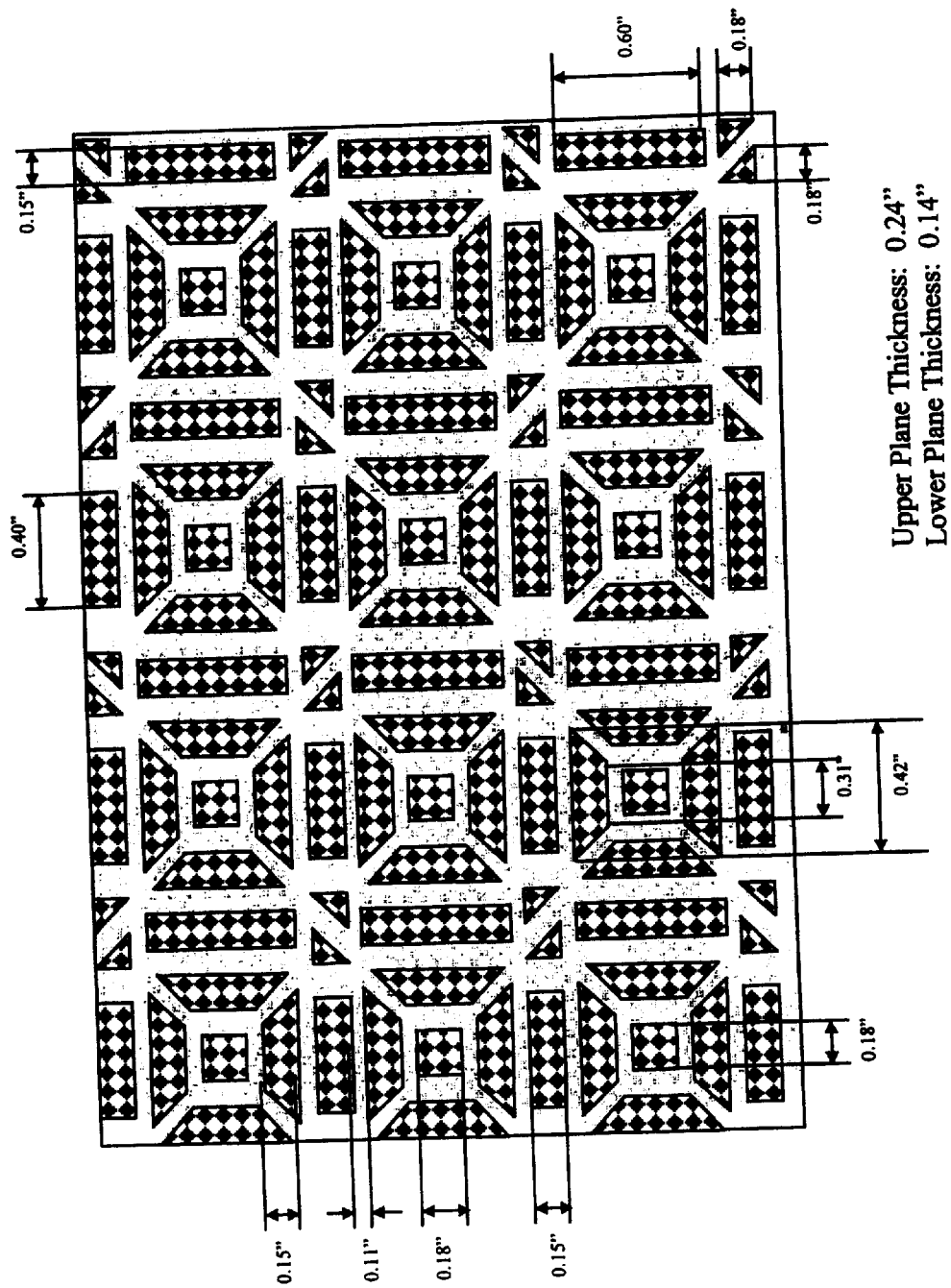

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Hydroentangling techniques have been developed for manufacture of nonwoven fabrics whereby patterning and imaging of the fabric can be affected as the fabric is hydraulically formed on a three-dimensional image transfer device. U.S. Pat. Nos. 5,098,764, 5,244,711, 5,822,823, and 5,827,597, the disclosures of which are hereby expressly incorporated by reference, relate to the use of such three-dimensional image transfer devices. Use of these types of devices permits greatly enhanced versatility in the production of hydroentangled fabrics.

The present invention contemplates durably combining two or more textile fabrics, at the same time an image is imparted into the resultant compound fabric, by the use of a three-dimensional image transfer device. Positioning of overlaid, or layered, textile fabrics upon the image-forming surface of a three-dimensional image transfer device, in conjunction with hydraulic treatment of the fabric, desirably acts to efficiently combine and impart a regular image defined by the image transfer device to the compound fabric. Under the influence of high-pressure liquid (water) streams, hydraulic treatment of the woven fabric layers results in displacement of the interwoven yarns so that the fabric is imparted with a patterned image defined by the image transfer device. Additionally, imaging of the fabric can be effected as a result of the washing of dyes from the fabric under the influence of the high-pressure liquid streams, thus enhancing the three-dimensional imaging which can be created, or providing a pattern of color differentiation which can, in itself, be desirable.

The fabric of the present invention may be used in a wide variety of traditional textile applications, including apparel, home fashions, and industrial applications. Apparel applications of the disclosed fabric include bottom weights, such as pants and shorts, while home fashions applications include, but are not limited to, bedding, window coverings, such as sheers or blinds, and draperies. Industrial applications of the present invention include protective covers of outdoor equipment as well as protective wear.

With reference to FIG. 1, therein is illustrated an apparatus for practicing the present method for forming a non-woven fabric. The compound fabric is formed from the combination of two or more textile fabrics, shown in roll form at unwind stations 10 and 11. Suitable textile fabrics include those comprising weaves and knits formed from yarns comprising fibers. Such fibers may be selected from natural or synthetic composition, of homogeneous or mixed fiber length. Suitable natural fibers include, but are not limited to, cotton and viscose rayon. Synthetic fibers, which may be blended in whole or part, include thermoplastic and thermoset polymers. Thermoplastic polymers suitable for this application include polyolefins, polyamides and polyesters. The thermoplastics may be further selected from homopolymers, copolymers, conjugates and other derivatives including those thermoplastic polymers having incorporated melt additives or surface-active agents. The profile of the fiber is not a limitation to the applicability of the present invention.

It is within the purview of the present invention that a scrim can be interposed between the textile fabric layers. The purpose of the scrim is to reduce the extensibility of the resultant three-dimensional imaged compound fabric, thus reducing the possibility of three-dimensional image distortion and further enhancing fabric durability. Suitable scrims include unidirectional monofilament, bi-directional monofilament, expanded films, open meshes and thermoplastic spunbond.

The compound fabric has also been found to yield an interesting product when the textile fabric layers are purposefully delaminated from the compound fabric. As the entangled layers are drawn away from one another, the constituent fibers of the bloomed yarns elongate and either disentangle or break. The newly freed fiber ends tend to create a crimped presentation and were found to maintain a z-direction orientation. Conversely, the other end of the constituent fibers remained entrained in the woven yarn and provided a durable presentation of the pile to abrasion. It is envisioned that a high speed pile formation process embodying the present invention whereby the compound fabric is then delaminated is a reasonable alternative to either specially woven fabrics with z-directional yarns that require shearing or the use of teasel combs and brushes on substantially planar fabrics.

EXAMPLES

Example 1

Using a forming apparatus as illustrated in FIG. 1, a compound fabric was made in accordance with the present invention by providing a first textile fabric annotated as "WL1" at unwind station 11 and second textile fabric annotated as "WL2" at unwind station 10. The textile fabric used on both unwind stations was a woven 50% polyester/50% cotton fabric of 120 thread count. The textile fabrics were unwound at an equivalent rate and positioned in face-to-face juxtaposition then wetted and lightly entangled at pre-entanglement station 15. The pre-entanglement station 15 includes a foraminous forming surface in the form of belt 12 upon which the overlaid textile fabrics are positioned for pre-entangling by entangling manifolds 14. In the present examples, each of the entangling manifolds 14, included 120 micron orifices spaced at 42.3 per inch, with the manifolds successively operated at 100, 300, and 1500 pounds per square inch, with a line speed of 35 feet per minute. The entangling apparatus of FIG. 1 further includes an imaging drum 18 comprising a three-dimensional image transfer device for effecting imaging of the pre-entangled layered fabric construct. The image transfer device includes a moveable imaging surface which moves relative to a plurality of imaging manifolds 22 which act in cooperation with three-dimensional elements defined by the imaging surface of the image transfer device to effect imaging and patterning of the fabric being formed. The imaging manifolds 22 includes 120 micron orifices spaced at 42.3 per inch, with the three manifolds operated at 3500 pounds per square inch each. The imaged compound fabric was dried using two stacks of steam drying cans at 300° F.

The particular image transfer device used was a 100 mesh pattern whereby per one inch square there are one hundred MD and one hundred CD interwoven metal wires.

Example 2

Using the apparatus described in Example 1, a compound fabric was fabricated whereby in the alternative a 0.5 ounce carded web of 1.2 denier polyester was interposed between the 120 thread count woven layers. The entangling manifolds 14 were operated at successive pressures of 100, 300, 1000, and 1500 pounds per square inch. The imaging manifolds were operated at 4500 pounds per square inch. Overall line speed was maintained at 35 feet per minute. The image transfer device included four different regions, each region corresponding to FIGS. 2, 3, 4 and 5.

Example 3

Using the apparatus described in Example 1, a compound fabric was fabricated whereby in the alternative a 3.5 ounce carded web of 3 denier polyester was interposed between the 120 thread count woven layers. The entangling manifolds 14 were operated at successive pressures of 100, 300, 1000, and 1500 pounds per square inch. The imaging manifolds were operated at 4500 pounds per square inch. Overall line speed was maintained at 35 feet per minute. The image transfer device included four different regions, each region corresponding to FIGS. 2, 3, 4 and 5.

Example 4

Using the apparatus described in Example 1, a compound fabric was fabricated whereby in the alternative a 1.0 ounce thermal point bonded polyester spunbond was interposed between the 120 thread count woven layers. The entangling manifolds 14 were operated at successive pressures of 100, 300, 1000, and 1500 pounds per square inch. The imaging manifolds were operated at 4500 pounds per square inch. Overall line speed was maintained at 35 feet per minute. The image transfer device included four different regions, each region corresponding to FIGS. 2, 3, 4 and 5.

From the foregoing, numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

Test Procedures

Grab Tensile Test (ASTM D 5034)

This test is meant to measure the breaking strength of the fabric in units of either grams or pounds as well as measures the elongation of the fabric.

Drape (INDA IST 90.0-75 R82)

A Handle-o-Meter is utilized to measure the flexural resistance of the fabric. The Handle-o-Meter records the grams of force required for the moveable beam to displace the fabric through a slot with a predetermined width.

Mullen Burst (ASTM D 461)

This test measures the pressure (psi) required to rupture the fabric when pressure is increased at a controlled constant rate.

Elmendorf Tear (ASTM D 5734)

The Elmendorf Tear determines the force in grams required to tear a sample after the tear has been initiated, which provides a measure of internal tearing resistance as distinguished from the initial tearing resistance.

A sample of the compound fabric from Example 1 was placed in an Instron Tensile test device with the bottom face of the compound fabric affixed by clamp to base of the Instron and upper face affixed by clamp to the movable platform. The moveable platform was then operated at constant rate to move away from the base, thus purposefully delaminating the compound fabric. A pronounced yet durable pile formation was noted.

The compound fabric from Example 4 was tested and compared to another compound fabric as in Example 4, less one 120 thread count woven layer. As illustrated in Table 1, the tri-layered compound fabric as described in Example 4, was more than two times stiffer than the bi-layered compound fabric.

TABLE 1

| | ITD | Basis Weight (osy) | Mullen Burst (psi) | Tensile @ Peak-MD (lb) | Elong. @ Peak-MD (%) | Tensile @ Peak-CD (lb) | Elong. @ Peak-CD (%) | Handle-o-Meter-CD (grams) | Handle-o-Meter-MD (grams) | Elmendorf Tear-MD (grams) | Elmendorf Tear-CD (grams) |
|---|---|---|---|---|---|---|---|---|---|---|---|
| single layer of 120 ct. woven plus a layer of SBPET | no ITD | 3.97 | 104 | 69 | 13 | 38 | 33 | 153 | 43 | 892 | 1305 |
| | Sm. segmented diamond | 4.06 | | 59 | 15 | 39 | 34 | 50 | 153 | 638 | 1013 |
| | Lg. segmented diamond | 4.06 | | 68 | 16 | 39 | 31 | 49 | 150 | 662 | 963 |
| | Small squares | 4.06 | | 64 | 15 | 37 | 31 | 52 | 159 | 651 | 1007 |
| | Large squares | 4.06 | | 67 | 15 | 39 | 29 | 59 | 176 | 532 | 922 |
| two layers of 120 ct. woven | no ITD | 6.85 | 194 | 129 | 18 | 82 | 28 | 644 | 297 | 1872 | 2370 |

TABLE 1-continued

| ITD | Basis Weight (osy) | Mullen Burst (psi) | Tensile @ Peak-MD (lb) | Elong. @ Peak-MD (%) | Tensile @ Peak-CD (lb) | Elong. @ Peak-CD (%) | Handle-o-Meter-CD (grams) | Handle-o-Meter-MD (grams) | Elmendorf Tear-MD (grams) | Elmendorf Tear-CD (grams) |
|---|---|---|---|---|---|---|---|---|---|---|
| plus a middle layer of SBPET | | | | | | | | | | |
| Sm. segmented diamond | 7.16 | 200+ | 136 | 19 | 82 | 36 | 256 | 722 | 1261 | 1794 |
| Lg. segmented diamond | 7.15 | 200+ | 138 | 18 | 85 | 32 | 264 | 722 | 1363 | 1823 |
| Small squares | 7.16 | 200+ | 139 | 17 | 74 | 32 | 293 | 717 | 1284 | 1819 |
| Large squares | 7.16 | 200+ | 135 | 17 | 79 | 32 | 260 | 723 | 1007 | 1819 |

What is claimed is:

1. A method of forming a compound textile fabric, comprising the steps of:
   providing a first textile fabric having a plurality of interwoven warp and weft yarns;
   providing a second textile fabric having a plurality of interwoven warp and weft yarns;
   providing a three-dimensional image transfer device having a foraminous image-forming surface comprising a regular pattern of three-dimensional surface elements;
   positioning said first textile fabric in face to face juxtaposition with said second textile fabric; and
   positioning the overlaid textile fabric layers on said image transfer device, then integrating and hydraulically imaging said overlaid textile fabric layers by subjecting said fabric layers to pressurized liquid streams applied to a surface of said fabric facing away from said image transfer device to thereby impart said regular pattern of said image-forming surface to said fabric.

2. A method of forming a compound textile fabric as in claim 1, wherein said interwoven yarns are selected from a group of natural fibers, synthetic fibers, or a combination thereof.

3. A method of forming a compound textile fabric as in claim 2, wherein said natural fibers are selected from the group consisting of cotton, wood pulp, rayon and the combinations thereof.

4. A method of forming a compound textile fabric as in claim 2, wherein said synthetic fibers are selected from are selected from the group consisting of polyacrylates, polyesters, polyamides, polyolefins, and the combinations thereof.

5. A method of forming a compound textile fabric, comprising the steps of:
   providing a first textile fabric having a plurality of interwoven warp and weft yarns;
   providing an intermediate fibrous layer;
   providing a second textile fabric having a plurality of interwoven warp and weft yarns;
   Providing a three-dimensional image transfer device having a foraminous image-forming surface comprising a regular pattern of three-dimensional surface elements;
   positioning said first textile fabric in face to face juxtaposition with said second textile fabric wherein said intermediate fibrous layer is interposed between the first and second textile fabric layers; and
   positioning the overlaid textile fabric layers on said image transfer device, then integrating and hydraulically imaging said overlaid textile fabric layers by subjecting said fabric layers to pressurized liquid streams applied to a surface of said fabric facing away from said image transfer device to thereby impart said regular pattern of said image-forming surface to said fabric.

6. A method of forming a compound textile fabric, comprising the steps of:
   providing a first textile fabric having a plurality of interwoven warp and weft yarns;
   providing an intermediate scrim layer;
   providing a second textile fabric having a plurality of interwoven warp and weft yarns;
   providing a three-dimensional image transfer device having a foraminous image-forming surface comprising a regular pattern of three-dimensional surface elements;
   positioning said first textile fabric in face to face juxtaposition with said second textile fabric wherein said intermediate fibrous layer is interposed between the first and second textile fabric layers; and
   positioning the overlaid textile fabric layers on said image transfer device, then integrating and hydraulically imaging said overlaid textile fabric layers by subjecting said fabric layers to pressurized liquid streams applied to a surface of said fabric facing away from said image transfer device to thereby impart said regular pattern of said image-forming surface to said fabric.

7. A method of forming a compound textile fabric as in claim 6, wherein
   said scrim is selected from the group consisting of uni-directional monofilament, bi-directional monofilament, expanded films, open meshes, and thermoplastic spunbond.

* * * * *